(12) United States Patent
Kraai et al.

(10) Patent No.: US 8,573,629 B1
(45) Date of Patent: Nov. 5, 2013

(54) TOW BAR AND LATCH ASSEMBLY

(75) Inventors: Jason Jay Kraai, Hull, IA (US); Russell Mark Ensz, Matlock, IA (US)

(73) Assignee: Dethmers Manufacturing Company, Boyden, IA (US)

(*) Notice: Subject to any disclaimer, the term of this patent is extended or adjusted under 35 U.S.C. 154(b) by 796 days.

(21) Appl. No.: 12/706,239

(22) Filed: Feb. 16, 2010

Related U.S. Application Data

(63) Continuation-in-part of application No. 12/418,719, filed on Apr. 6, 2009, now Pat. No. 7,837,216.

(60) Provisional application No. 61/144,153, filed on Jan. 12, 2009.

(51) Int. Cl.
*B60D 1/54* (2006.01)
*B60D 1/14* (2006.01)
*B60D 1/167* (2006.01)

(52) U.S. Cl.
USPC .................. 280/491.4; 280/491.3; 280/491.5; 280/494

(58) Field of Classification Search
USPC ............. 280/494, 405.1, 406.1, 406.2, 455.1, 280/491.3, 491.4, 491.5; 403/321, 322.1, 403/326, 49, 96; 292/358, 359
See application file for complete search history.

(56) References Cited

U.S. PATENT DOCUMENTS

| | | | |
|---|---|---|---|
| 1,185,435 A | 5/1916 | Powell | |
| 2,071,883 A | 2/1937 | La Hodny | |
| 2,139,970 A | 12/1938 | Moore | |
| 2,366,294 A * | 1/1945 | Stringer | 280/482 |
| 2,620,585 A * | 12/1952 | Delcey | 43/12 |
| 2,916,301 A | 12/1959 | Cushman | |
| 3,014,738 A * | 12/1961 | Kasten | 280/482 |
| 4,577,883 A * | 3/1986 | Duncan | 280/491.4 |
| RE35,482 E | 3/1997 | Johnson | |
| 5,765,851 A | 6/1998 | Parent | |
| 5,909,887 A | 6/1999 | Hobrath | |
| 5,915,715 A * | 6/1999 | Ford | 280/494 |
| 5,957,477 A * | 9/1999 | Ensz et al. | 280/482 |
| 6,502,847 B1 | 1/2003 | Greaves | |
| 6,612,604 B2 | 9/2003 | Greaves | |
| 6,764,092 B1 | 7/2004 | Greaves | |
| 7,461,855 B2 * | 12/2008 | Klar | 280/478.1 |
| 7,959,180 B1 * | 6/2011 | Huston et al. | 280/493 |
| 2007/0114761 A1 * | 5/2007 | Klar | 280/491.2 |
| 2008/0156962 A1 * | 7/2008 | Chen | 248/653 |

* cited by examiner

*Primary Examiner* — Paul N Dickson
*Assistant Examiner* — Daniel Yeagley
(74) *Attorney, Agent, or Firm* — Eric Karich

(57) ABSTRACT

A tow bar has first and second bar elements telescopically engaged to slide between an extended configuration and a collapsed configuration. A latch housing mounted on the second bar element pivotally mounts a latch element. A locking sear having a sear locking surface and a sear back surface is pivotally mounted to move between a locking position and an unlocking position. In the locking position, a sear locking surface abuts a latch stop of the first bar element to lock the first and second bar elements in the extended configuration. In the unlocking position, the sear locking surface disengages the latch stop, allowing the first and second bar elements to move to the collapsed configuration.

1 Claim, 7 Drawing Sheets

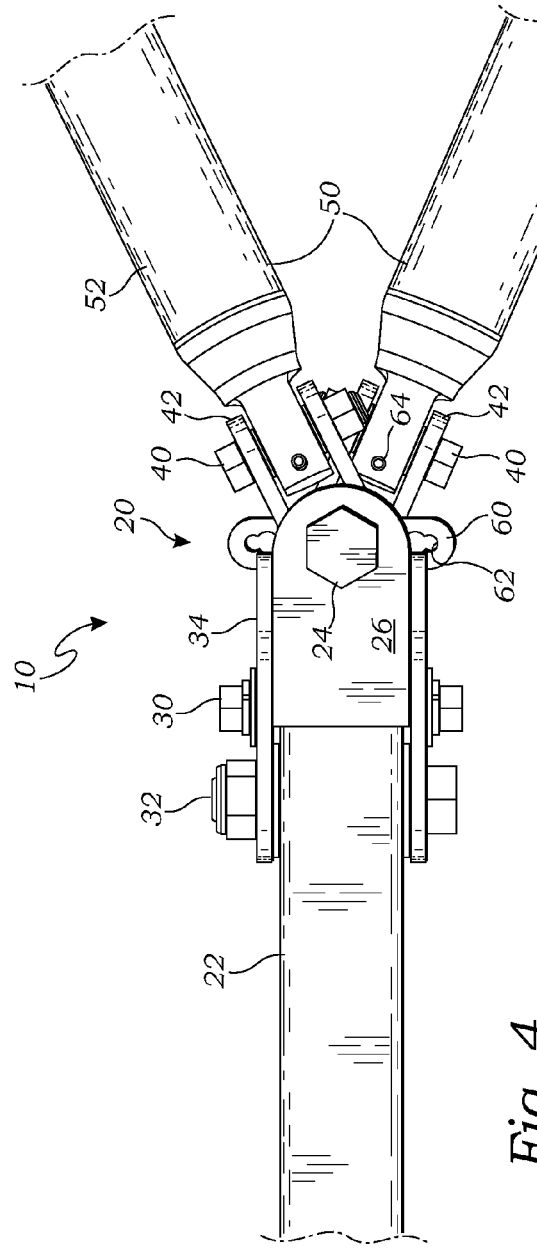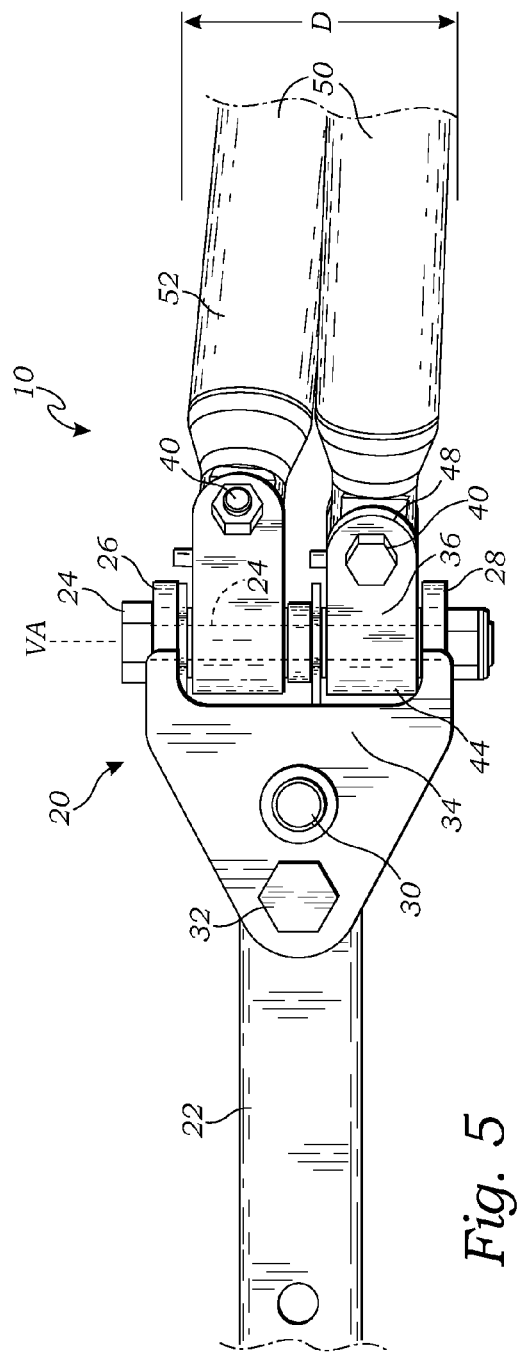

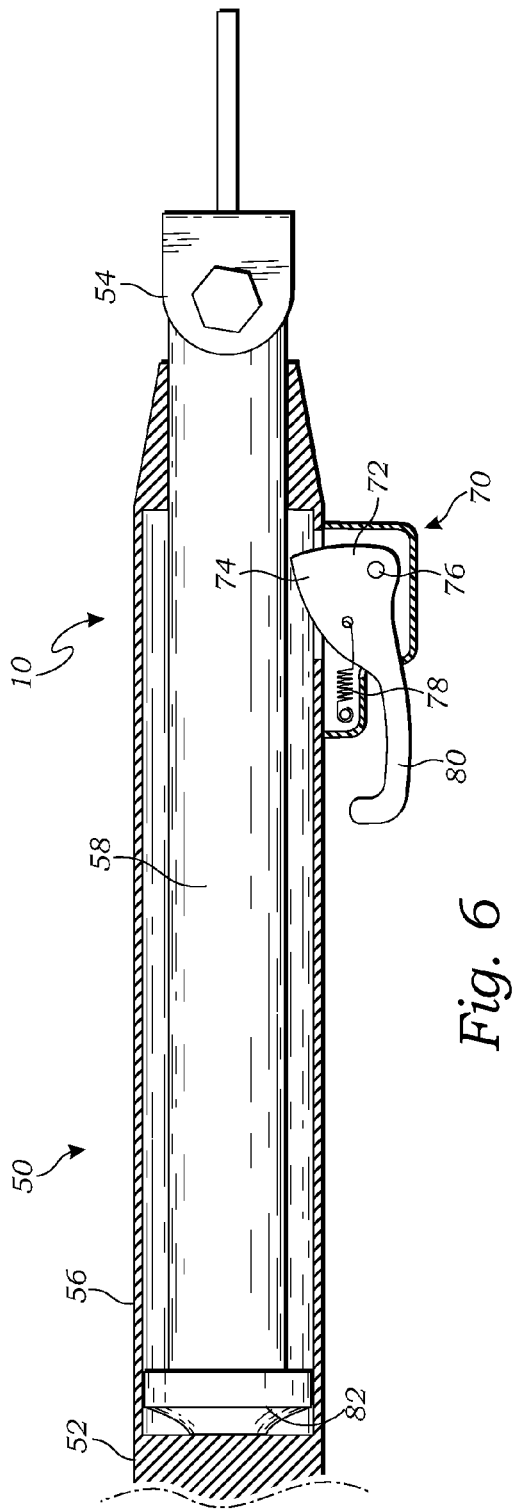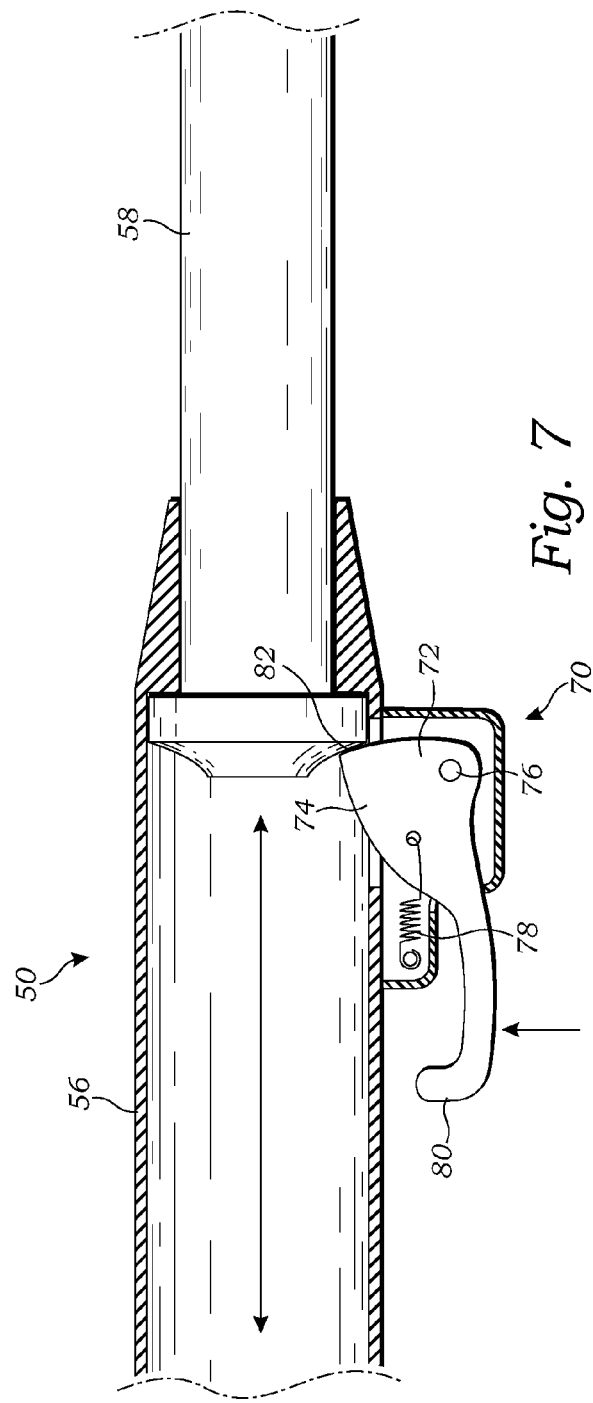

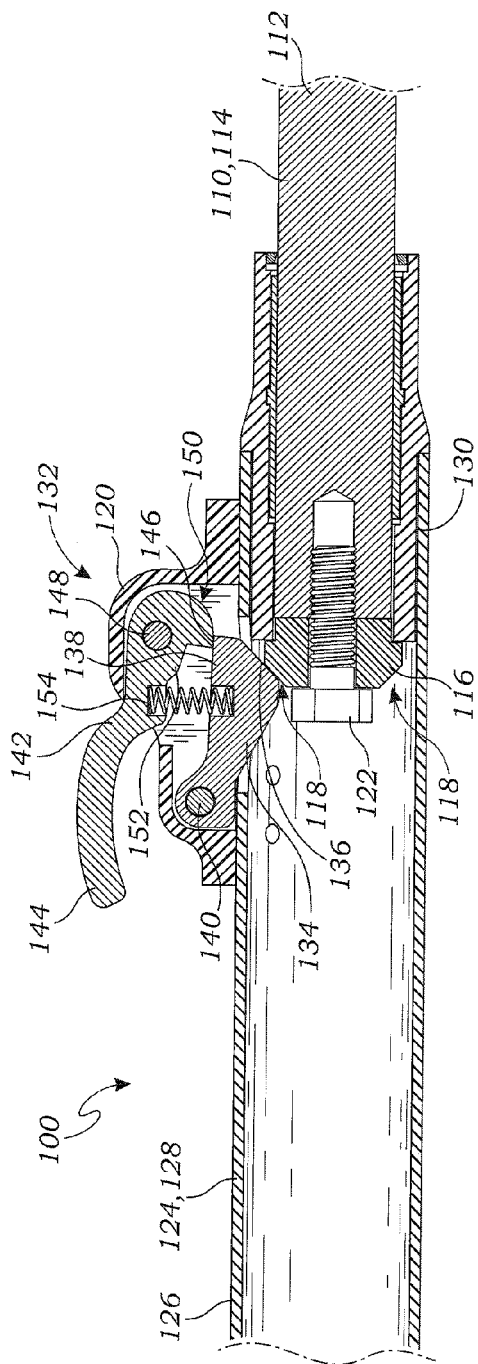
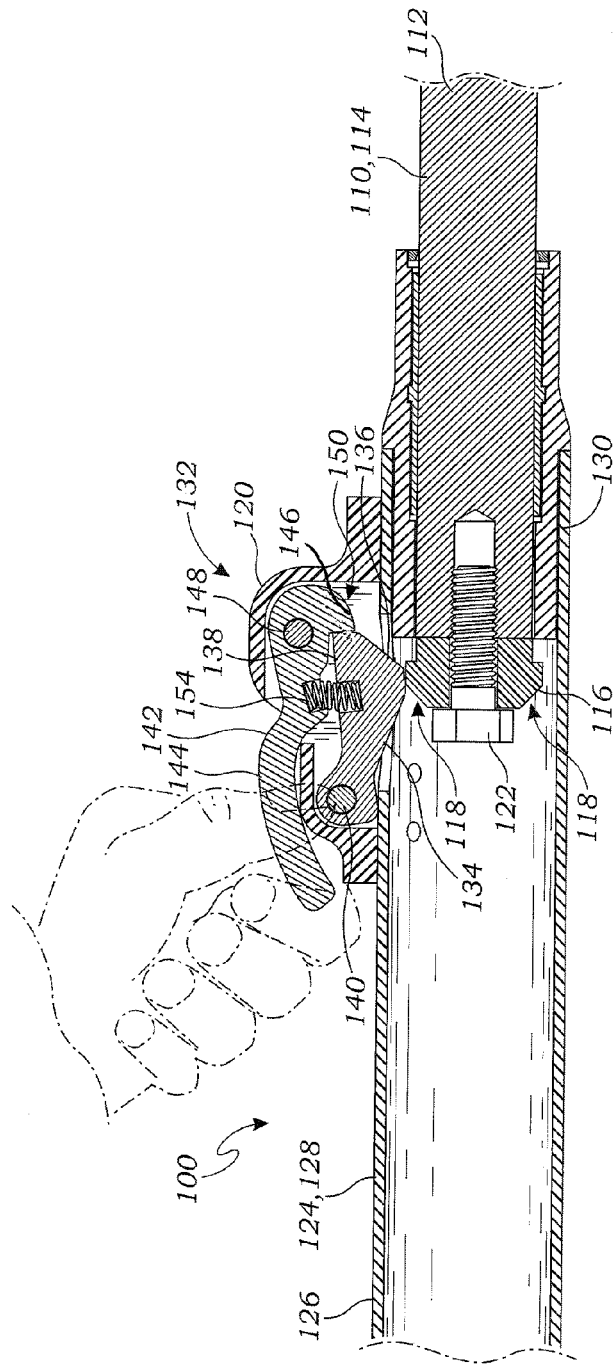
Fig. 8
Fig. 9

TOW BAR AND LATCH ASSEMBLY

CROSS-REFERENCE TO RELATED APPLICATIONS

This application for a utility patent is a continuation-in-part of a previously filed utility patent, still pending, having the application Ser. No. 12/418,719, filed Apr. 6, 2009 now U.S. Pat. No. 7,837,216. This application also claims the benefit of U.S. Provisional Application No. 61/144,153, filed Jan. 12, 2009.

BACKGROUND OF THE INVENTION

1. Field of the Invention

This invention relates generally to tow bars, and more particularly to a pair of tow bars each having first and second telescopically engaged bar elements, and a latch assembly that enables the bar elements to rotate with respect to one another while latched in an extended configuration.

2. Description of Related Art

The state of the art in delta-type tow bar assemblies is disclosed in Greaves, U.S. Pat. Nos. 6,764,092, 6,612,604, and 6,502,847, which teach a delta-type tow bar apparatus for towing a towed vehicle. Examples of similar or related tow bars are shown in Parent, U.S. Pat. No. 5,765,851, Johnson, U.S. RE 35,482, R. E. Moore, U.S. Pat. No. 2,139,970, J. E. Powell, U.S. Pat. No. 1,185,435, W. W. Cushman, U.S. Pat. No. 2,916,301, W. La Hodny, U.S. Pat. No. 2,071,883, and Hobrath, U.S. Pat. No. 5,909,887.

One problem with such a delta-type tow bar apparatus is that it must be constructed to accommodate rotational movement between the towing and towed vehicles without binding and/or failing. Various elements (e.g., ball and socket elements, etc.) have been adapted to accommodate such movement, with varying degrees of success.

The prior art teaches various forms of delta-type tow bars that are adapted to be mounted between the towed and towing vehicle. However, the prior art does not teach a tow bar apparatus that includes a pair of tow bars that each can individually rotate to accommodate rotational movement between the towing and towed vehicles, even when latched in an extended configuration with a latch assembly. The present invention fulfills these needs and provides further related advantages as described in the following summary.

SUMMARY OF THE INVENTION

The present invention teaches certain benefits in construction and use which give rise to the objectives described below.

The present invention provides a tow bar comprising a first bar element having a proximal end, a first elongate body, and a latch stop opposite the proximal end; a second bar element having a distal end, a second elongate body, and a latch end opposite the distal end, the first bar element being telescopically engaged within the second bar element to slide between an extended configuration and a collapsed configuration; a latch housing mounted on the latch end of the second bar element; a locking sear having a sear locking surface and a sear back surface, the locking sear being movably mounted to move between a locking position and an unlocking position, wherein when the locking sear is in the locking position, the sear locking surface abuts the latch stop to lock the first and second bar elements in the extended configuration, and wherein when the locking sear is in the unlocking position, the sear locking surface disengages the latch stop, allowing the first and second bar elements to move to the collapsed configuration; a latch element having a latch handle and a latch locking surface, the latch element being movably mounted on or within the latch housing to move between a braced position and a release position, wherein when the latch element is in the braced position, the latch locking surface abuts the sear back surface to maintain the locking sear in the locking position, and wherein when the latch element is in the release position, the latch locking surface does not abut the sear back surface, thereby enabling the locking sear to move away from the locking position towards the unlocking position; and a biasing element for biasing the latch element towards the braced position.

A primary objective of the present invention is to provide a tow bar having advantages not taught by the prior art.

Another objective is to provide a tow bar that can easily transition between extended and collapsed configurations.

Another objective is to provide a tow bar that includes first and second bar elements that may rotate with respect to each other when latched with a latch assembly in an extended configuration, thereby accommodating rotational movements between towing and towed vehicles without binding or failing.

A further objective is to provide a tow bar having a latch element that remains securely latched while in use, but which may be easily released with a simple movement of a latch handle.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 4 is a top plan view thereof;

FIG. 5 is a side elevational view thereof;

FIG. 6 is a sectional view of one of the pair of tow bars in a stored configuration;

FIG. 7 is a sectional view thereof in an elongate, towing position;

FIG. 8 is a sectional view of an alternative embodiment of one of the tow bars, illustrating first and second bar elements in an extended configuration;

FIG. 9 is a sectional view thereof, illustrating a latch handle being pushed to a released position, enabling a locking sear to move to an unlocking position relative to a latch stop of the first bar element.

DETAILED DESCRIPTION OF THE INVENTION

The above-described drawing figures illustrate the invention, a tow bar apparatus 10 for use by a towing vehicle 12 to tow a towed vehicle 16 over a surface S, such as a road.

Figure 1:
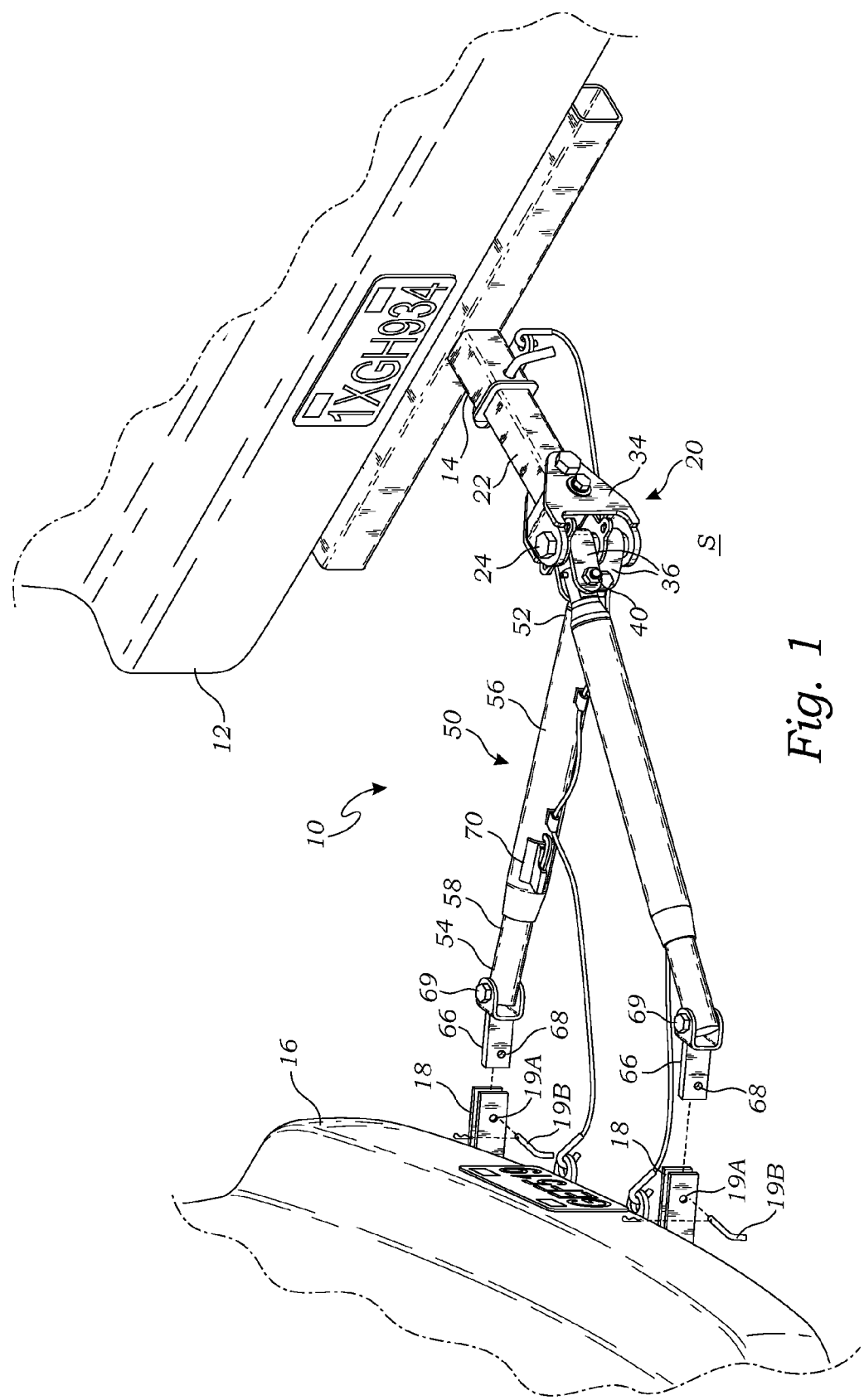
FIG. 1 is a perspective view of a tow bar apparatus in one embodiment of the present invention, illustrating the tow bar apparatus being installed between a towing vehicle and a towed vehicle.
Figure 2:
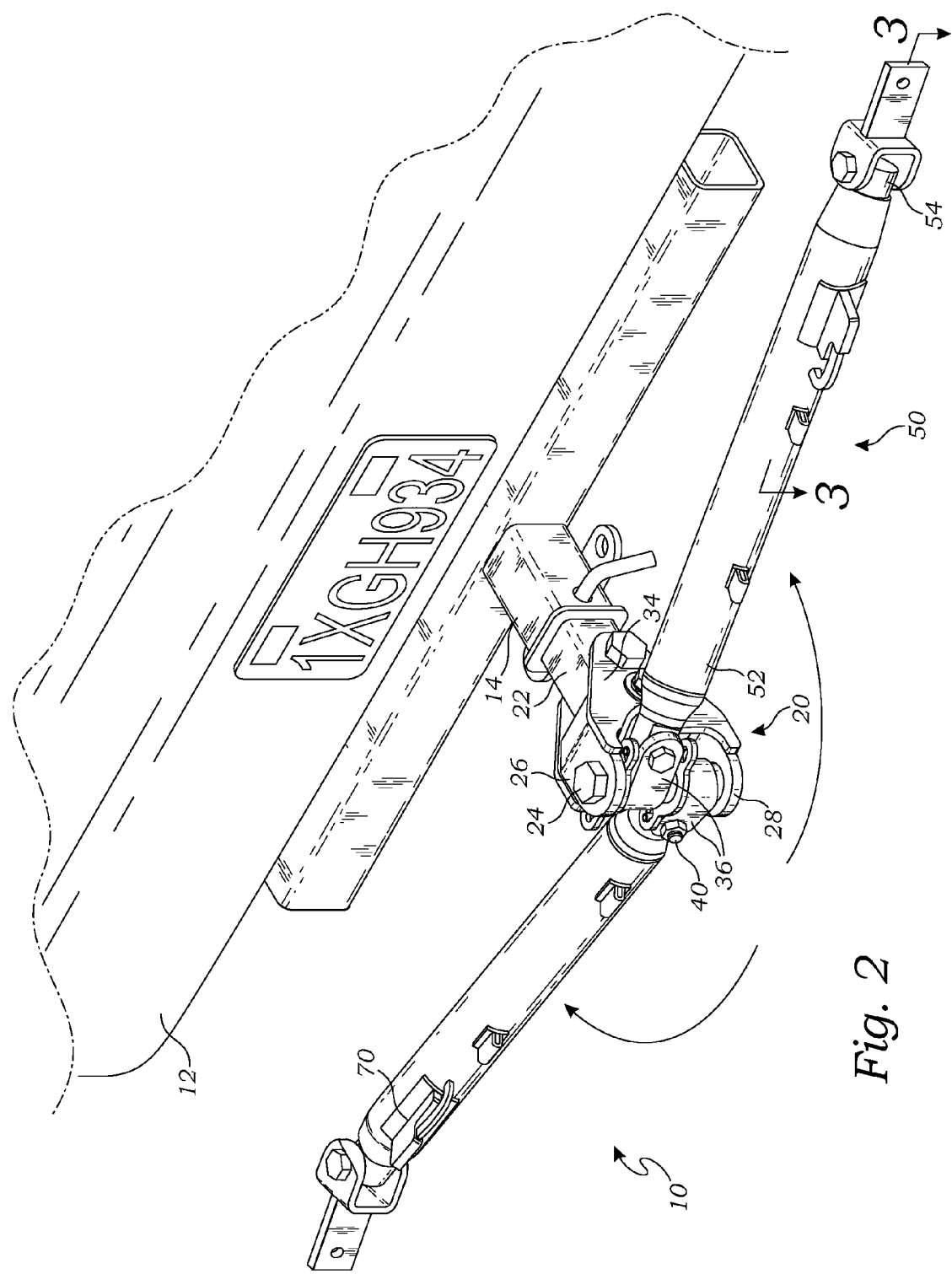
FIG. 2 is a perspective view of the tow bar apparatus in a stored position on the towing vehicle.

FIG. 1 is a perspective view of the tow bar apparatus 10 in one embodiment of the present invention, illustrating the tow bar apparatus 10 in a towing position between the towing vehicle 12 and the towed vehicle 16. FIG. 2 is a perspective view of the tow bar apparatus 10 in the stored position on the towing vehicle 12, when not towing the towed vehicle 16.

As illustrated in FIG. 1, both the towing vehicle 12 and the towed vehicle 16 include structures that are adapted to physically engage the tow bar apparatus 10. The towing vehicle 12 has a hitch receiver 14 that is used for towing vehicles, trailers, and the like. For purposes of this application, the term "hitch receiver" is hereby defined to include any form of towing hitch known in the art that may be adapted for use as described herein. Since receivers and other forms of towing hitches are well known in the art, it is not described in greater detail herein.

Likewise, the towed vehicle 16 has a pair of attachment points 18 that are adapted to securely engage the tow bar apparatus 10 with the towed vehicle 16. In one embodiment, the pair of attachment points 18 may each include a pair of tabs constructed of steel or similarly strong and durable material. The tabs 18 each include apertures 19A adapted to receive a locking pin 19B, as is described in greater detail below. However, while these tabs 18 are one embodiment of the attachment points 18, the attachment points 18 may be provided by any form of physical structure that is readily adapted for attaching the tow bar apparatus 10, and such alternatives should be considered within the scope of the present invention.

As shown in FIG. 1, the tow bar apparatus 10 includes a hitch member 20 that is adapted to be removably engaged with the hitch receiver 14 of the towing vehicle 12. The tow bar apparatus 10 also includes a towed vehicle attachment element 66 that is adapted to be removably engaged with the attachment points 18 of the towed vehicle 16. The hitch member 20 and the towed vehicle attachment element 66 are discussed in greater detail below.

Figure 3:
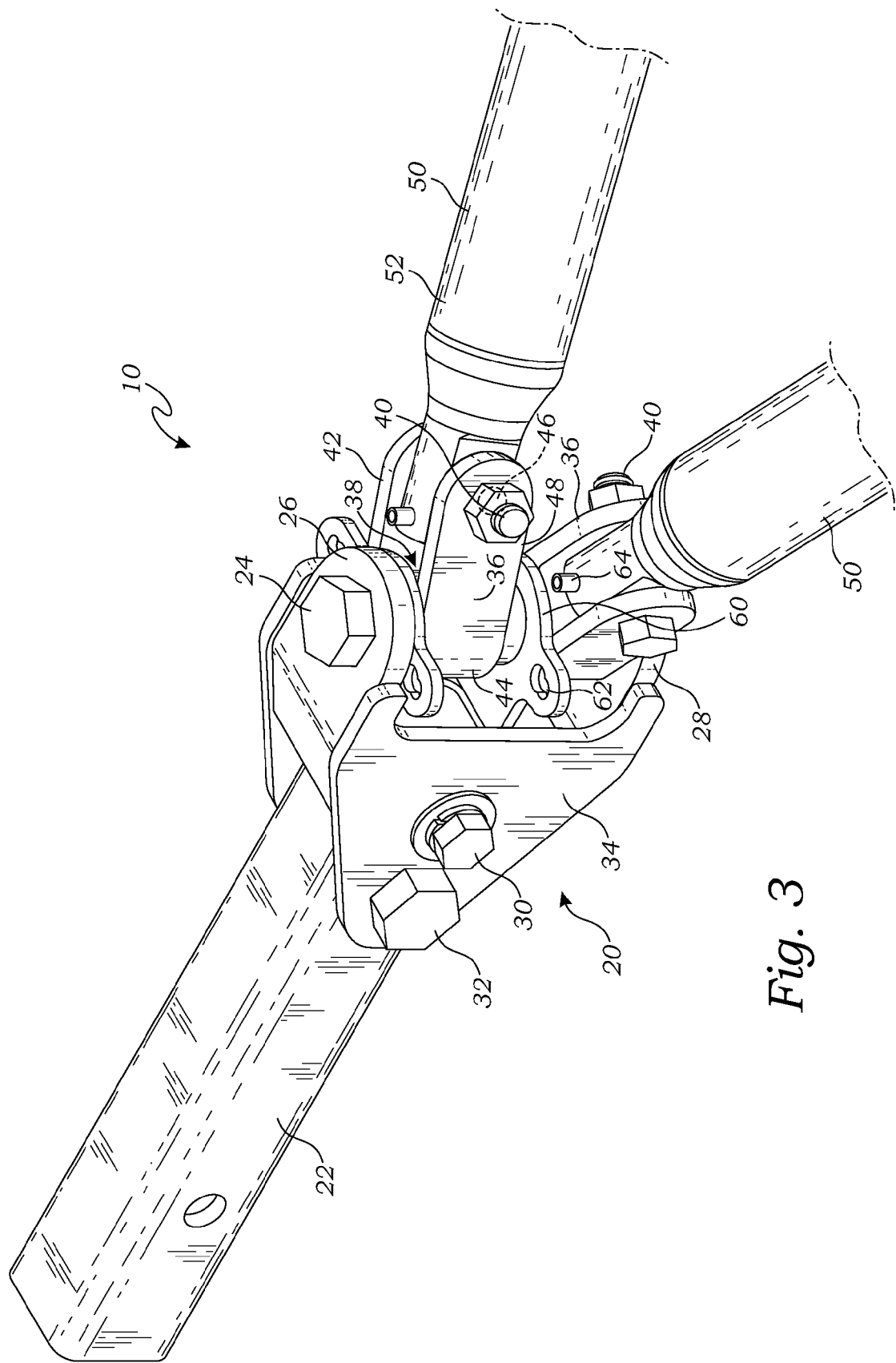
FIG. 3 is a perspective view of a hitch member of the tow bar apparatus.

FIG. 3 is a perspective view of the hitch member 20 of the tow bar apparatus 10. FIG. 4 is a top plan view of the hitch member 20, and FIG. 5 is a side elevational view thereof. As illustrated in FIGS. 1-5, the hitch member 20 has a receiver tube 22 and a vertical pivot post 24. The receiver tube 22 is adapted to removably engage the hitch receiver 14 of the towing vehicle 12. In the present embodiment, the receiver tube 22 is a steel tubular construction having a square cross section, although other shapes and materials are also possible. For purposes of this application, the term "receiver tube" is defined to include alternative constructions that are adapted to removably engage the hitch receiver 14, described above. The specific physical construction is not critical, as long as the two elements function to removably mount the hitch member 20 on the towing vehicle 12.

The vertical pivot post 24 has a vertical axis VA that is generally orthogonal to the surface S when the hitch member 20 is mounted on the towing vehicle 12. The pivot post may be any form of bolt, rod, or similar structure upon which a pair of linkages 36 may be mounted in a stacked arrangement such that they may pivot on a horizontal plane, as described in greater detail below.

In one embodiment, the vertical pivot post 24 is formed by a bolt that passes through a top plate 26 and a bottom plate 28. The top and bottom plates 26 and 28 are spaced by a distance D great enough to receive the pair of linkages 36 therebetween. The top and bottom plates 26 and 28 may be connected by side panels 34, and fastened to the receiver tube 22 with a pivot bolt 32 and a locking bolt 30 through the side panels 34 and the receiver tube 22. The locking bolt 30 may be engaged in different aperture (not shown) or at different locations of a slot (not shown) to adjust the angle of the vertical pivot post 24, as is known in the art, to adjust for the different relative heights of the towing vehicle 12 and the towed vehicle 16. Since this adjustment is well known in the prior art, and is described in Greaves, U.S. Pat. No. 6,764,092, which is hereby incorporated by reference in full, it is not described in greater detail herein.

As illustrated in FIGS. 1-5, the pair of linkages 36 each include a vertical aperture 38 and a horizontal pivot pin 40. The vertical aperture 38 is adapted for pivotally mounting the linkages 36 on the vertical pivot post 24 of the hitch member 20 such that the linkages 36 are mounted in a stacked arrangement and such that the linkages 36 may pivot horizontally about the vertical axis VA of the vertical pivot post 24, on the horizontal plane (which is generally parallel to the surface S).

Each of the pair of linkages 36 may include a U-shaped body 42 having the vertical aperture 38 formed in a base 44 of the U-shaped body 42. The horizontal pivot pin 40 may be positioned through apertures through a top of the U-shaped body 42. While this construction is used in the present embodiment, those skilled in the art may devise alternative constructions that function in a similar or equivalent manner, and such alternatives should be considered within the scope of the present embodiment.

The tow bar apparatus 10 further includes a pair of tow bars 50 that are each adapted to be mounted on one of the linkages 36. Each of the tow bars 50 has a proximal end 52, and a distal end 54 opposite the proximal end 52. In one embodiment, each of the pair of tow bars 50 may be formed by a first tow bar element 56 telescopically engaged with a second tow bar element 58 such that the first and second tow bar elements 58 slide into and out of each other. The first and second tow bar elements 56 and 58 may slide between a collapsed configuration, wherein they are a shorter length that is suitable for storage, and an elongate towing configuration wherein they are extended to full length and most suitable for towing.

The proximal end 52 of each of the first tow bar elements 56 is adapted to be pivotally attached to one of the linkages 36 with the horizontal pivot pin 40. The horizontal pivot pin 40 enables the tow bar 50 to pivot vertically with respect to the linkage 36. Together, the vertical pivot post 24 and the horizontal pivot pin 40 enable the tow bar 50 a wide range of motion with respect to the hitch member 20.

In one embodiment, the tow bars 50 are identical to each other, thereby reducing manufacturing costs and inventory.

As illustrated in FIGS. 2 and 3, in one embodiment, a storage plate 60 may be positioned on the vertical pivot post 24 adjacent the proximal ends 52 of the tow bars 50 for locking the tow bars 50 in the stored position. The storage plate 60 has a stored locking aperture 62 positioned adjacent the proximal end 52 of the tow bars 50. A locking post 64 (best shown in FIG. 3) of the proximal end 52 may engage the stored locking aperture 62 of the storage plate 60 when the tow bar 50 is in a stored position, thereby locking the tow bar 50 in the stored position, as illustrated in FIG. 2. While FIG. 2 shows the tow bars 50 on opposite sides of the vertical pivot post 24, they could also both be locked on the same side, depending upon the needs of the user.

The distal end 54 of each of the tow bars 50, opposite the proximal end 52, includes a towed vehicle attachment element 66 pivotally attached to the tow bar 50. The towed vehicle attachment element 66 is pivotally attached to the tow bar 50 with a vertical pivot pin 69. The vertical pivot pin 69 enables the towed vehicle attachment element 66 to pivot on a horizontal plane with respect to the tow bar 50.

As illustrated in FIG. 1, the towed vehicle attachment element 66 is adapted to be removably attached to the pair of attachment points 18 of the towed vehicle 16. In one embodiment, the towed vehicle attachment element 66 may be a tab with a locking aperture 68. The tab 66 is adapted to be positioned in one of the pair of the attachment points 18 of the towed vehicle 16 and locked in place with the locking pin 19B. While the tab is one embodiment of the towed vehicle attachment element 66, alternative constructions may also be utilized, and such alternatives should be considered within the scope of the present invention.

FIG. 6 is a sectional view of one of the pair of tow bars 50 in a collapsed configuration. FIG. 7 is a sectional view of one of the pair of tow bars 50 in an elongate, towing configuration. As illustrated in FIGS. 6-7, the tow bar apparatus 10 includes a locking element 70 that removably locks the first and second tow bar elements 56 and 58 in the elongate towing configuration, so that they do not collapse while in use. The locking element 70 is preferably fastened to the first tow bar element 56, and abuts the second two bar element 58 in a manner that enables the rotation of the first tow bar element 56 with respect to the second tow bar element 58 when the tow bar 10 is in the elongate towing configuration.

As illustrated in FIGS. 6-7, in one embodiment the locking element 70 may be a cam element 72 that is pivotally connected to the first tow bar element 56 with a cam pivot pin 76 such that a locking portion 74 of the cam element 72 is located within the first tow bar element 56 adjacent the second tow bar element 58. A spring 78 biases the cam element 72 toward a locking position, and a handle 80 extends from the cam element 72 for moving the cam element 72 to an unlocking position.

FIG. 6 illustrates the tow bar 50 in the collapsed configuration. When the tow bar 50 is moved to the extended towing configuration, as shown in FIG. 7, the locking portion 74 of the cam element 72 engages a cam engaging portion 82 of the tow bar, and the spring 78 holds the cam element 72 in place. The cam-engaging portion 82 may be annular and shaped to enable the locking portion 74 of the cam element 72 to rotate with respect to the cam engaging portion 82. The construction of the locking element 70 enables the first and second tow bar elements 56 and 58 to rotate with respect to each other without interference by or harm to the locking element 70. This rotation enables a further range of movement by the tow bars 50 with respect to the hitch member 20. When the tow bar apparatus 10 is subjected to a twisting motion or stress, this stress and/or movement may be accommodated without damage to the tow bar apparatus 10.

When the handle 80 is squeezed toward the tow bar 50, the bias of the spring 78 is overcome, the cam element 72 disengages from the cam engaging portion 82, and allows the tow bar 50 to be collapsed for storage.

The first and second tow bar elements 56 and 58, and/or the locations of the locking element 70, may be reversed, and such an obvious reversal of the explicitly disclosed embodiment is considered expressly within the scope of the claimed invention, and all terminology is hereby defined to include such a reversal of the present embodiment.

While one embodiment of the locking element 70 is disclosed herein, alternative embodiments are also included within the scope of this term. For example, a locking pin (not shown) might engage an annular groove (not shown) of the tow bar 50, thereby locking the tow bar 50 in a given configuration, but enabling rotation of the first and second tow bar elements 56 and 58. Those skilled in the art may devise any number of similar and/or equivalent embodiments, and such alternatives should be considered within the scope of the present invention.

Figure 10:
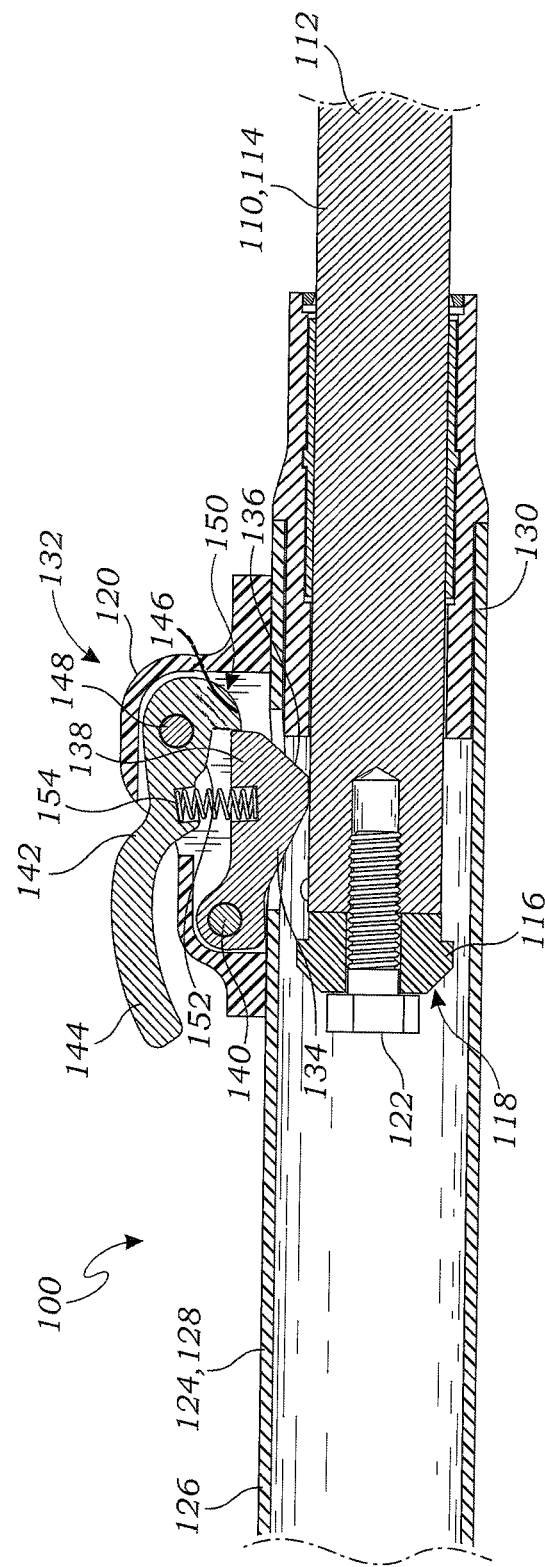
FIG. 10 is a sectional view thereof, illustrating the first and second bar elements moving from the extended configuration towards a collapsed configuration.

FIG. 8 is a sectional view of an alternative embodiment of one a tow bar 100, illustrating first and second bar elements 110 and 124 in an extended configuration. FIG. 9 is a sectional view thereof, illustrating a latch handle 144 being pushed to a released position, enabling a locking sear 134 to move to an unlocking position relative to a latch stop 116 of the first bar element 110. FIG. 10 is a sectional view thereof, illustrating the first and second bar elements 110 and 124 moving from the extended configuration towards a collapsed configuration.

As illustrated in FIGS. 8-10, the tow bar 100 includes a first bar element 110 and a second bar element 124. The first bar element 110 is telescopically engaged within the second bar element 124 to slide between an extended configuration and a collapsed configuration. In the preferred embodiment, the first bar element 110 includes a proximal end 112, a first elongate body 114, and a latch stop 116 opposite the proximal end 112. The proximal end 112 is adapted to be attached to the towing vehicle, as discussed in greater detail above. The first elongate body 114 is strong, rigid, and durable enough for use in towing vehicles, and may be, for example, a steel rod, tubular steel, aluminum, or any other configuration and/or material suitable for such purposes.

The latch stop 116 is shaped to abut other components for locking the first and second bar elements 110 and 124 in the extended configuration, as discussed below. In the preferred embodiment, the latch stop 116 has an annular surface 118 construction that enables a twisting rotation between the first and second bar elements 110 and 124, as discussed above, when the sear locking surface 136 bears against the annular surface 118. A sear locking surface 136, described below, is able to rotate around the annular surface 118 while bearing against the latch stop 116 and locking the first and second bar elements 110 and 124 in the extended configuration. Such rotation is critical to the performance of the tow bar 100, which must be able to accommodate twisting rotation between the towing and towed vehicles without binding or failing.

In one embodiment, the latch stop 116 is a latch stop washer attached to the first bar element 110 with a fastener 122. The fastener 122 may be a bolt positioned through the latch stop washer and threadedly engaged with the first bar element 110. In alternative embodiments, the fastener 122 may be another suitable element known to those skilled in the art. The latch stop 116 may also have alternative construction and attachment, as would be known to those skilled in the art, and such alternatives should be considered within the scope of the present invention.

The second bar element 124 has a distal end 126, a second elongate body 128, and a latch end 130 opposite the distal end 126. The distal end 126 is adapted to be attached to a towed vehicle, as discussed above (or to the towing vehicle, in the inverse of the present embodiment). All of the terms used herein are expressly defined to include the inverse of the described embodiment, wherein the construction is reversed with respect to the towed and towing vehicles.

The second elongate body 128 is also constructed of a strong, rigid material (e.g., tubular steel). The latch end 130 may include a latch housing 120 that is adapted to mount and/or contain the latch mechanism 132 for locking the first and second bar elements 110 and 124 in the extended configuration. The latch housing 120 may be mounted on the latch end 130 of the second bar element 124 with any attachment mechanism known in the art (e.g., bolts, integral construction, welding, etc.). The latch housing 120 provides a solid mounting point and/or housing for the latch mechanism 132.

The latch mechanism 132 preferably includes a locking sear 134 and a latch element 142 for latching the first and second bar elements 110 and 124 in the extended configuration. The locking sear 134 may include a sear locking surface 136 and a sear back surface 138, and the locking sear 134 may be movably mounted to move between a locking position and an unlocking position. In the locking position, the sear locking surface 136 abuts the latch stop 116 to lock the first and second bar elements 110 and 124 in the extended configuration, and in the unlocking position the sear locking surface 136 disengages the latch stop 116, thereby allowing the first and second bar elements 110 and 124 to move to the collapsed configuration. In the embodiment of FIGS. 8-10, the locking sear 134 is pivotally mounted on a sear pivot 140 to pivot between the two positions, although other mechanisms (e.g., sliding, lateral movement, any form of hinged movement).

The latch element 142 may have a latch handle 144 and a latch locking surface 146. The latch element 142 may be movably mounted on or within the latch housing 120 to move between a braced position and a release position. When the latch element 142 is in the braced position, the latch locking surface 146 abuts the sear back surface 138 to maintain the locking sear 134 in the locking position. When the latch element 142 is in the release position, the latch locking surface 146 does not abut the sear back surface 138, thereby enabling the locking sear 134 to move away from the locking position towards the unlocking position. In the embodiment of FIGS. 8-10, the latch element 142 is pivotally mounted on a latch pivot 148, and the latch element 142 includes a cam feature 150 that includes a recessed portion 152 adjacent the latch locking surface 146. When the latch element 142 is in the release position, the locking sear 134 is able to pivot into the recessed portion 152, thereby enabling movement of the first and second bar elements 110 and 124 to the collapsed configuration.

In one embodiment, the latch mechanism 132 further includes a biasing element 154 for biasing the locking sear 134 towards to the locking position and the latch element 142 towards the braced position. In the present embodiment, the biasing element 154 is a spring positioned between the locking sear 134 and the latch mechanism 132. In the embodiment of FIGS. 8-10, the spring 154 is a compression spring, although other forms of spring mechanisms (e.g., leaf spring, etc.) or other biasing means (e.g., resilient materials, etc.) may also be utilized by those skilled in the art.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A tow bar comprising:
   a first bar element having a proximal end, a first elongate body, and a latch stop opposite the proximal end;
   a second bar element having a distal end, a second elongate body, and a latch end opposite the distal end, the first bar element being telescopically engaged within the second bar element to slide between an extended configuration and a collapsed configuration; and
   a latch mechanism adapted to abut the latch stop to lock the first and second bar elements in the extended configuration, the latch mechanism comprising:
     a locking sear having a sear locking surface and a sear back surface, the locking sear being pivotally mounted on a sear pivot to move between a locking position and an unlocking position, wherein when the locking sear is in the locking position the sear locking surface abuts the latch stop to lock the first and second bar elements in the extended configuration, and wherein when the locking sear is in the unlocking position, the sear locking surface disengages the latch stop, allowing the first and second bar elements to move to the collapsed configuration;
     a latch element having a latch locking surface for locking directly against the sear back surface of the locking sear to maintain the locking sear in the locking position;
     the latch element further including a cam feature that includes a recessed portion adjacent the latch locking surface, the latch element being pivotally mounted on a latch pivot for pivoting such that the latch locking surface disengages the sear back surface, such that the sear back surface can move upwardly into the recess and the locking sear can move to the unlocking position;
     a compression spring between the locking sear and the latch mechanism for biasing the locking sear towards the locking position, and for also biasing the latch element upwardly so that the latch locking surface is engaged with the locking sear; and
     a latch handle that extends outwardly from the latch element for enabling a user to move the latch element so that the latch locking surface disengages the locking sear.

* * * * *